US012772033B2

(12) United States Patent
Nandi et al.

(10) Patent No.: US 12,772,033 B2
(45) Date of Patent: Oct. 20, 2026

(54) DEVICE DISCOVERY ON A LOCAL NETWORK

(71) Applicant: Roku, Inc., San Jose, CA (US)

(72) Inventors: Sudipto Nandi, San Jose, CA (US); Ashok Ranganath, Los Gatos, CA (US); Abhay Bhorkar, Cupertino, CA (US)

(73) Assignee: Roku, Inc., San Jose, CA (US)

( * ) Notice: Subject to any disclaimer, the term of this patent is extended or adjusted under 35 U.S.C. 154(b) by 280 days.

(21) Appl. No.: 18/628,139

(22) Filed: Apr. 5, 2024

(65) Prior Publication Data

US 2025/0317723 A1 Oct. 9, 2025

(51) Int. Cl.

*H04W 8/00* (2009.01)
*H04W 48/10* (2009.01)
*H04W 84/12* (2009.01)

(52) U.S. Cl.

CPC ........... *H04W 8/005* (2013.01); *H04W 48/10* (2013.01); *H04W 84/12* (2013.01)

(58) Field of Classification Search

None

See application file for complete search history.

(56) References Cited

U.S. PATENT DOCUMENTS

| | | | | |
|---|---|---|---|---|
| 9,185,653 B1 * | 11/2015 | Chow | ..................... | H04L 69/22 |
| 9,736,871 B2 * | 8/2017 | Kim | ..................... | H04W 72/23 |
| 2017/0054623 A1 * | 2/2017 | Amulothu | ............... | H04L 43/10 |
| 2018/0183729 A1 * | 6/2018 | Alsup | ................. | H04L 49/3036 |
| 2020/0267650 A1 * | 8/2020 | Lee | ....................... | H04W 16/14 |
| 2026/0095963 A1 * | 4/2026 | Xin | ....................... | H04W 76/12 |

* cited by examiner

*Primary Examiner* — Phirin Sam
(74) *Attorney, Agent, or Firm* — Akona IP PC

(57) ABSTRACT

Device discovery on a local network can cause suspended devices to not respond or to wake up and respond, both of which may be undesirable. To enable suspended devices to respond to a device discovery request without waking up, network interface controllers (NIC) are programmed with a device discovery protocol. A first device broadcasts a discovery frame that includes information indicating that it is a discovery frame. The NIC of a second device determines whether the received frame is a discovery frame. In response to receiving a discovery frame, the NIC of the second device returns a response that includes its device identifier. The NIC may issue the response frame directly, without waking up the second device. Alternatively, the NIC causes the second device to enter a discovery state, which enables the second device to respond to a discovery packet and then return to a suspend mode.

20 Claims, 11 Drawing Sheets

500

| Destination MAC (FFs) | Source MAC (Arbitrary) | EtherType (Reserved) | Payload Pattern |
| --- | --- | --- | --- |
| FF:FF:FF:FF:FF:FF | 00:11:22:33:44:55 | 0x8200 | FFFFFFDEADBEEF |

510

| Destination MAC | Source MAC | EtherType | Payload (TLV Format |
| --- | --- | --- | --- |
| 00:11:22:33:44:55 | AA:BB:CC:DD:EE:FF | 0x8200 | Type=<DID>, Length=12, Value=DID |

FIG. 5

DEVICE DISCOVERY ON A LOCAL NETWORK

TECHNICAL FIELD

This disclosure relates generally to electronic devices and systems, and more specifically, to techniques for discovering devices on a local network.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

Figure

FIG. 5 illustrates an example discovery frame and an example response frame, according to some embodiment of the disclosure.

DETAILED DESCRIPTION

Overview

Figure 1:
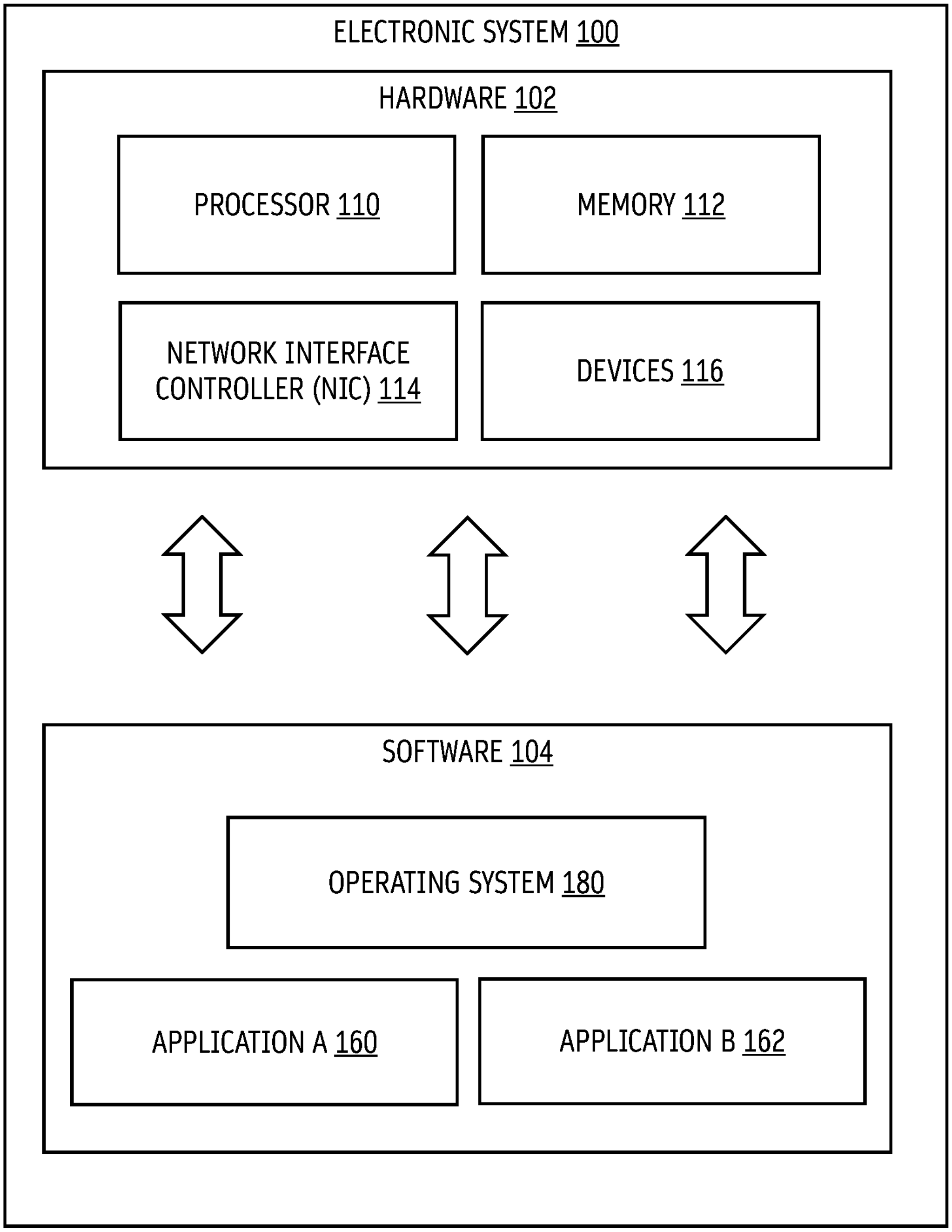
(FIG. 1 depicts a block diagram of exemplary electronic system configured to implement a device discovery protocol, according to some embodiments of the disclosure.

Local area networks (LANs) allow devices to communicate over networks. For example, electronic devices within a home may communicate over a LAN, where the LAN is implemented using one or more Wi-Fi routers within the home. The Wi-Fi routers may be further coupled to the Internet, so that devices on the LAN can access the Internet. With proliferation of consumer electronics devices and Internet-of-Things systems, a LAN can include a great number of devices.

A device connected to a LAN may want to know about other devices that are connected to the LAN for various reasons, e.g., to communicate with or coordinate with other devices on the network. To learn about other devices on the network, a device may transmit a broadcast discovery packet to other devices on the LAN. If a receiving device is asleep or suspended, it may ignore the broadcast discovery packet, so the transmitting device does not learn about the receiving device. Alternatively, the receiving device may be programmed to wake up in response to the broadcast discovery packet; the receiving device then processes the broadcast discovery packet and transmits a response. While this results in the transmitting device receiving the desired information about the receiving device, waking up the receiving device is not ideal; for example, device wakeup consumes power and may result in a light or screen being turned on, which can be confusing or disruptive to a person near the device. Instead, it may be preferable for a suspended receiving device to respond without waking up, or without fully waking up.

A protocol for device discovery on a network that does not require suspended devices to wake up, or fully wake up, is provided herein. The protocol may enable a set of related devices, e.g., devices associated with a particular supplier or manufacturer, to discover each other on a local network. The set of related devices may be configured to follow the discovery protocol. The devices may not have prior knowledge of each other; for instance, they may be separately installed in the home, and/or may be associated with different users. As an example, the devices may be different streaming devices (e.g., televisions with integrated streaming functionality, or streaming devices that can be coupled to a television or other display) that are installed in a home (e.g., different rooms of a home). The devices may be associated with different user accounts, e.g., a first user may be signed in on a first device, and a second user signed in on the second device. In this example, both the individual devices, and a server coupled to the devices (e.g., a server that manages a streaming service), may not be aware that the first and second devices are within the same local network.

The network interface controllers (e.g., Wi-Fi cards) of the devices may be configured according to the discovery protocol. For example, according to the discovery protocol, a first device broadcasts a discovery frame to the other devices on the local network. The discovery frame includes information (e.g., EtherType, payload value) indicating that it is a discovery frame. The Wi-Fi firmware of a second device is programmed to determine whether the details of a received frame indicate that the received frame is a discovery frame. In response to determining that it has received a discovery frame, the Wi-Fi firmware of the second device returns a response that includes a device identifier of the second device. In some embodiments, the Wi-Fi firmware of the second device issues a response frame directly, without waking up the second device (e.g., without turning on a display, checking for software updates, etc.). In other embodiments, Wi-Fi firmware causes the second device to enter a discovery state, which does not involve a full device wakeup, but instead enables the second device to respond to a discovery packet and then return to a sleep or suspend mode.

Exemplary Electronic System

FIG. 1 depicts a block diagram of exemplary electronic system 100 configured to implement a device discovery protocol, according to some embodiments of the disclosure. Electronic system 100 may in some cases be in the form of a computing device 1100 of FIG. 11. Electronic system 100 may include hardware 102 and software 104. Hardware 102 can include physical components of electronic system 100. Hardware 102 may include processor 110, memory 112, network interface controller (NIC) 114, and one or more devices 116. Examples of one or more devices 116 can include other communication devices, cryptography accelerator, decoder, light-emitting device, sensors, input device, output device, media card reader, identity module, etc.

NIC 114 may also be referred to as a network interface card, network adapter, LAN adapter, or physical network interface. Examples of NIC 114 include Wi-Fi adapters (e.g., WiFi cards) and Ethernet adapters (e.g., Ethernet cards). NIC 114 allows electronic system 100 to communicate over a computer network, either by using cables (e.g., in the case of an Ethernet adapter) or wirelessly (e.g., in the case of a Wi-Fi adapter). NIC 114 may operate as both a physical layer and data link layer device, as it provides physical access to a networking medium and provides low-level addressing system, e.g., through the use of medium access control (MAC) addresses that are uniquely assigned to network interfaces. NIC 114 may operate according to the IEEE 802.11 standard for implementing wireless LAN (WLAN) or another suitable networking standard, e.g., the IEEE 802.3 standard for implementing wired Ethernet. In some embodiments, electronic system 100 may include multiple NICs 114, e.g., a Wi-Fi adapter, a Bluetooth adapter, and/or an Ethernet adapter. NIC 114 may be controlled by firmware, as described further below.

Software 104 can include instructions, data, and/or programs that can be executed by a processor (e.g., processor 110) to perform one or more tasks and/or to manipulate one or more components in hardware 102. Software 104 can include operating system 180 and one or more applications (e.g., Application A 160 and Application B 162). Applications may be subsystems of electronic system 100. Examples of applications may include changing colors of a light bulb based on the time of day, turning on an alarm when a sensor detects unacceptable levels of indoor air pollution, capturing video footage at a front door of a home, tracking health metrics based on sensor data, counting a number of people that has walked past an area, performing inventory counting based on sensor data, monitoring equipment performance based on sensor data, monitoring atmospheric information based on sensor data, etc.

Operating system 180 may include software that manages hardware 102 and other resources in software 104. Operating system 180 can provide services for one or more applications. Operating system 180 can act as an intermediary between an application and hardware 102. Operating system 180 can implement one or more of: process management, memory management, device management, security, and input/output management. Operating system 180 may include one or more libraries corresponding to the one or more services. A library may include a well-defined application programming interface (API). A library may include corresponding implemented functions of the API. An API may include specifications for applications to make a request or call a function. For example, a library may include an API for using a device of the one or more devices 116. An application can open a library to start a service. The application can call a function defined in the library to perform an operation using the service.

Electronic system 100 may be capable of entering a low-power state, such as a sleep or suspend state. Such a state is referred to generally herein as a suspend state. Operating system 180 may initiate the suspend state in response to a lack of activity or a user request, for example. In a suspend state, the operating system 180 may retain a current state of electronic system 100 in a memory, while halting many operations. For example, processor 110 may not execute instructions, and certain peripheral devices (e.g., display screens, hard drives) may turn off or enter a low-power mode. In the suspend state, electronic system 100 may be responsive to certain inputs, such as user input devices (e.g., remote controls, keyboards, etc.) as well as network-based inputs to the NIC 114. After receiving a wake input, electronic system 100 may resume operation fairly quickly from the suspend state, without a full bootup sequence.

In some embodiments described herein, electronic system 100 may enter a discovery wake state in response to a discovery wake frame received from another device at NIC 114. In the discovery wake state, software 104 (e.g., operating system 180) is programmed to process and respond to a discovery packet from another electronic system 100 and then re-enter the suspend state, without performing a full wakeup procedure. For example, in the discovery wake state, electronic system 100 may not resume operations of peripheral devices, and may not wake up suspended applications (e.g., Application A 160 and Application B 162).

Exemplary Local Network Environment

Figure 2:
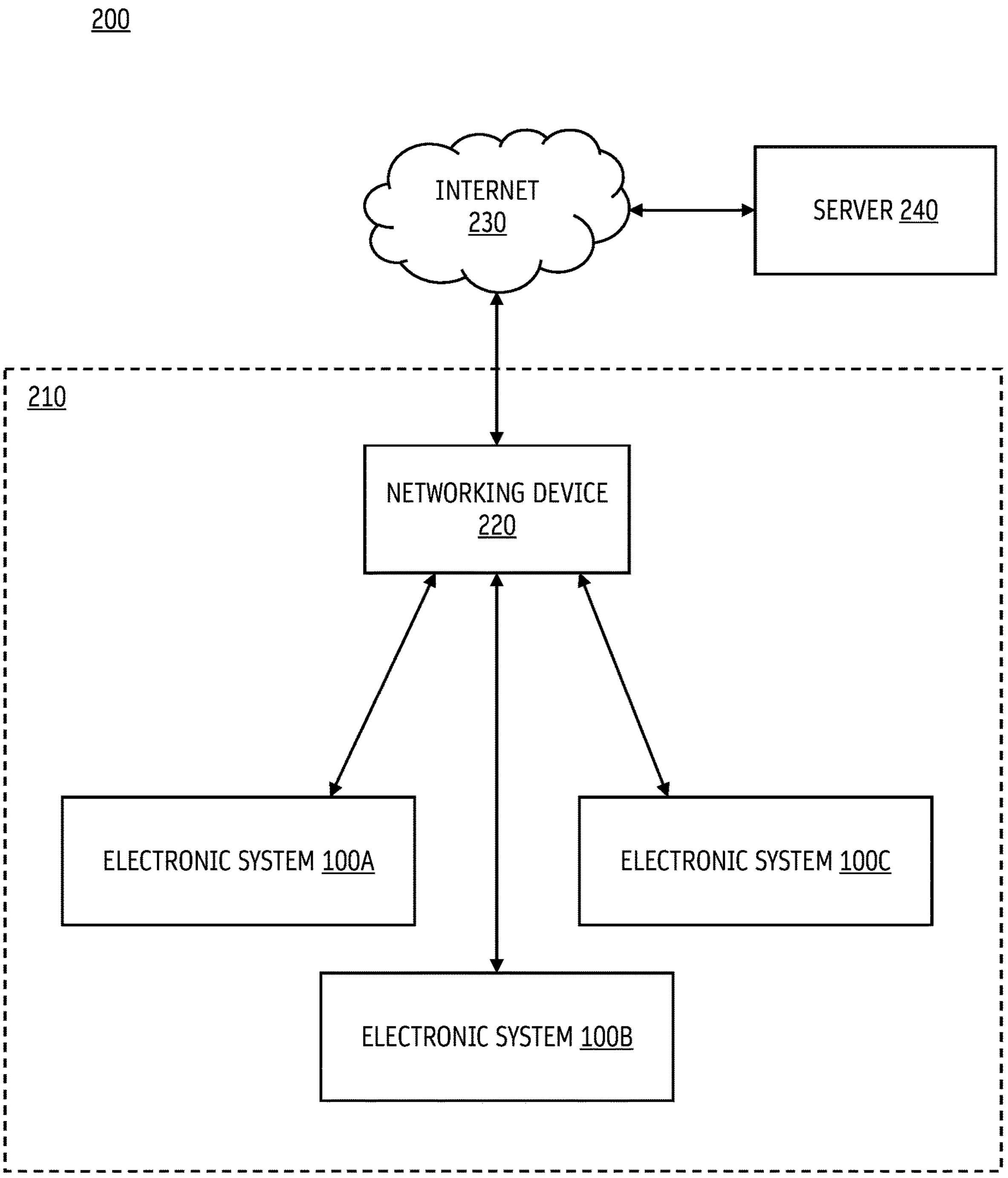
FIG. 2 illustrates an exemplary environment for device discovery over a local network, according to some embodiments of the disclosure.

FIG. 2 illustrates an exemplary environment for device discovery over a local network, according to some embodiments of the disclosure. Environment 200 includes a set of three electronic systems 100A, 100B, and 100C, which are examples of electronic system 100 of FIG. 1. Electronic systems 100A, 100B, 100C (referred to collectively as electronic systems 100) are coupled to networking device 220. Electronic systems 100 and networking device 220 form local network 210. Although, for this example, local network 210 includes three electronic systems 100 and one networking device 220, in other examples, local network 210 may include more or fewer electronic systems 100 and/or more than one networking device 220.

Networking device 220 provides connections to and between electronic systems 100 on the local network 210. In this example, networking device 220 further provides a connection to the Internet 230, so that electronic systems 100 may communicate with other systems and devices, such as server 240, that are connected to the Internet. Networking device 220 may be a Wi-Fi router. The networking device 220 may additionally or alternatively provide wired connections to a LAN, e.g., using Ethernet. In other embodiments, networking device 220 may be a wireless access point (AP) that is coupled to a router that connects to the Internet 230.

Server 240 may be related to one or more of electronic systems 100. For example, server 240 may provide data to one or more of electronic systems 100 and/or receive data from one or more of electronic systems 100 in conjunction with one or more applications, e.g., Application A 160 and/or Application B 162, executing on the electronic system 100.

First Exemplary Device Discovery Sequence

Figure 3A:
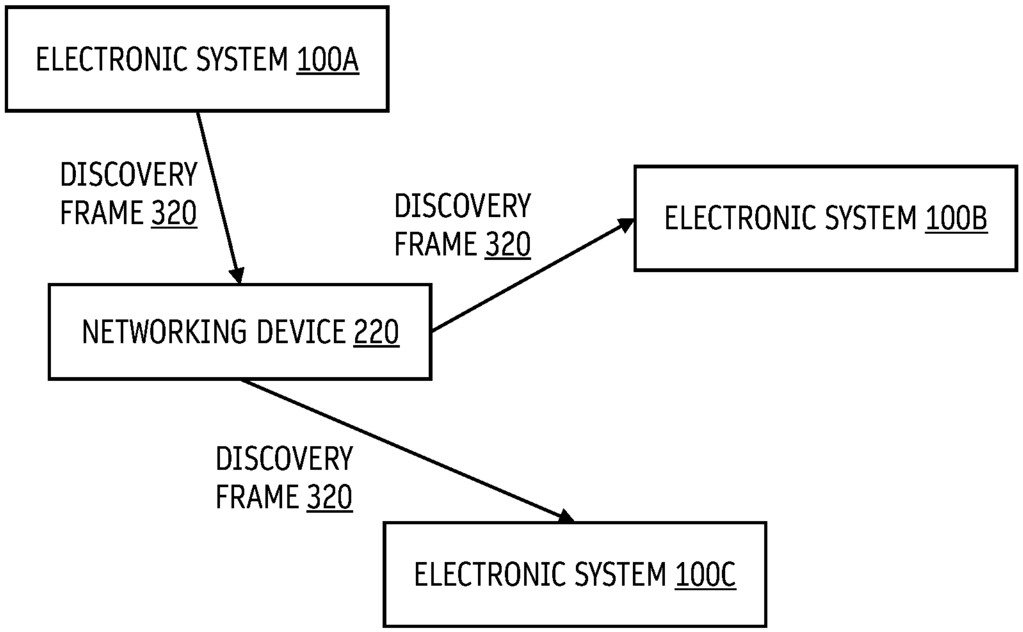
FIGS. 3A and 3B illustrate a discovery sequence across the local network, according to some embodiments of the disclosure.
Figure 3B:
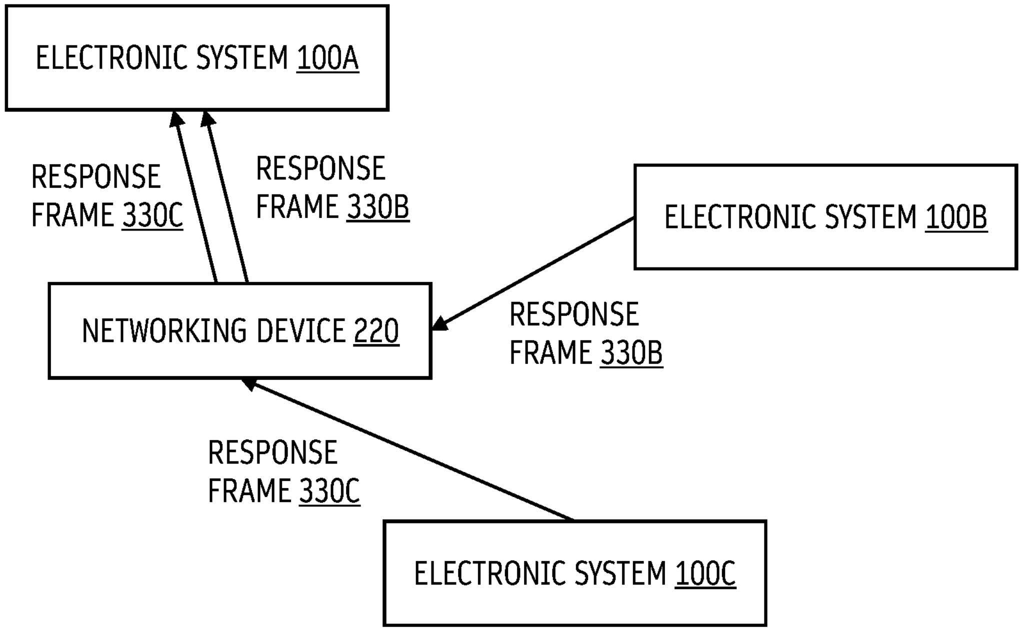

FIGS. 3A and 3B illustrate a first discovery sequence across a local network, e.g., local network 210, according to some embodiments of the disclosure. In FIG. 3A, electronic system 100A transmits discovery frame 320 to networking device 220. Discovery frame 320 is a communication at the data link layer, also referred to as Layer 2 or L2, of the seven-layer Open Systems Interconnection (OSI) model. The data link layer is the protocol layer that transfers data between nodes on a network, and in particular, transfers data-link frames, or simply frames, between nodes within a local network. Protocols operating at the data link layer include IEEE 802.11 (Wi-Fi) and IEEE 802.3 (Ethernet).

Discovery frame 320 may be a broadcast frame. For example, discovery frame 320 may have a destination MAC address FF:FF:FF:FF:FF:FF, indicating that discovery frame 320 is a broadcast frame, rather than directed to any particular MAC address. Discovery frame 320 may further have a source MAC address indicating the MAC address of electronic system 100A.

Networking device 220 transmits discovery frame 320 to other devices on the local network 210. For example, based on the broadcast MAC address, networking device 220 broadcasts discovery frame 320 to other devices on local network 210. In this example, networking device 220 transmits discovery frame 320 to electronic systems 100B and 100C.

In FIG. 3B, electronic systems 100B and 100C transmit respective response frames 330B and 330C to networking device 220. If electronic system 100B or 100C is in a sleep or suspend state, the electronic system 100B or 100C may issue the response frame without waking from the sleep or suspend state. Response frames 330B and 330C may each include a destination MAC address matching the source MAC address of discovery frame 320. Networking device 220 passes response frames 330B and 330C to electronic system 100A.

Figure 4:
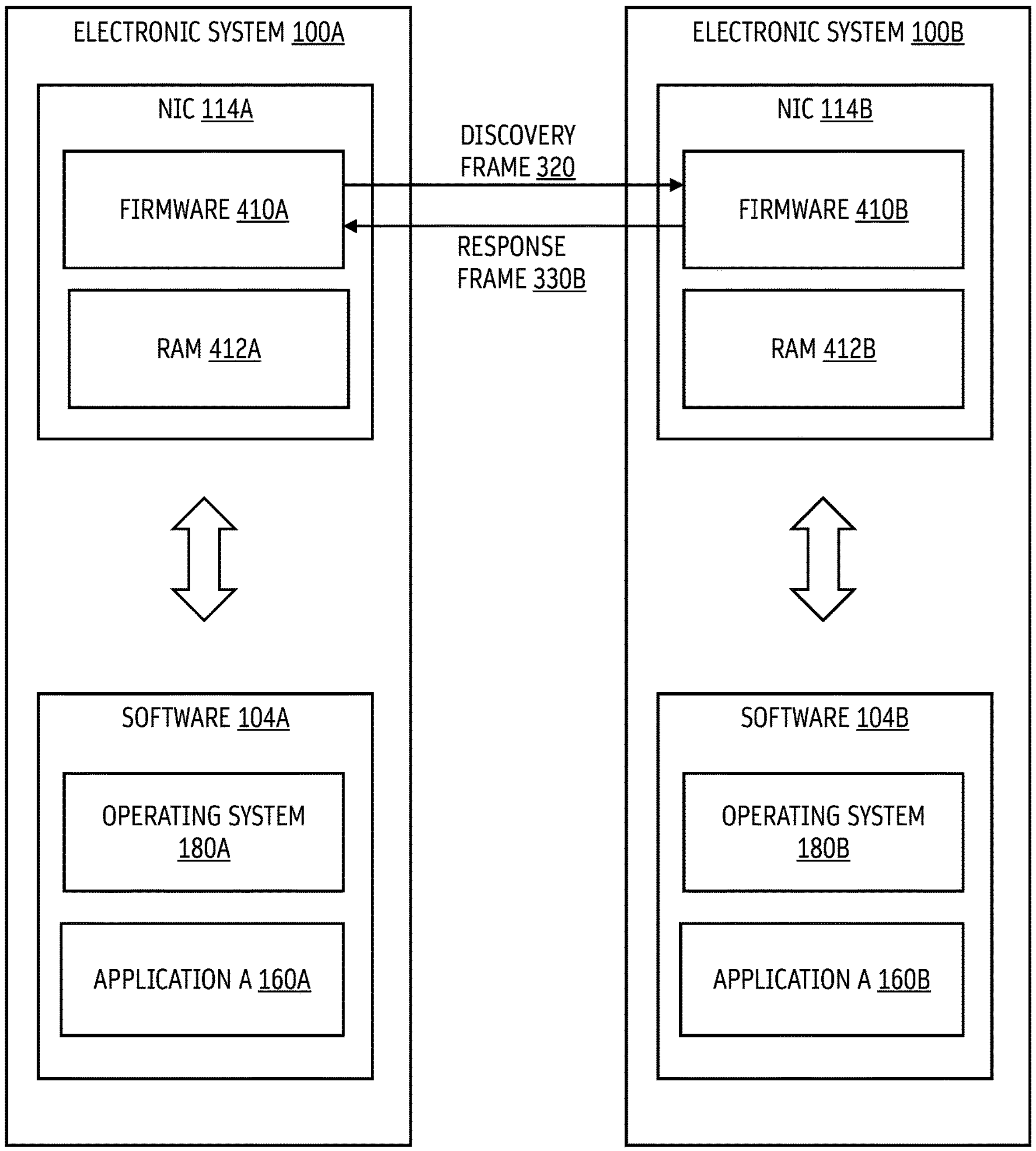
FIG. 4 illustrates a pair of electronic systems performing the discovery sequence, according to some embodiments of the disclosure.

FIG. 4 illustrates a pair of electronic systems performing the discovery sequence, according to some embodiments of the disclosure. Electronic system 100A includes NIC 114A, which is an example of NIC 114 of FIG. 1. NIC 114A includes firmware 410A, which is computer software on NIC 114A that provides low-level control of device-specific hardware of NIC 114A. For example, firmware 410A may act as the operating system of NIC 114A. Firmware 410A may be stored on non-volatile memory (e.g., read-only memory (ROM) or flash memory) of NIC 114A. NIC 114A also includes random access memory (RAM) 412A, such as static RAM (SRAM) or dynamic RAM (DRAM). Electronic system 100A further includes software 104A, which is an example of software 104 of FIG. 1. As described with respect to FIG. 1, software 104A includes operating system 180A and Application A 160A.

Electronic system 100B includes NIC 114B, which includes firmware 410B and RAM 412B. NIC 114B and firmware 410B may be similar to NIC 114A and firmware 410A, respectively. RAM 412B may store information describing electronic system 100B, such as a device identifier of 100B. Electronic system 100B further includes software 104B, which includes operating system 180B and Application A 160B. During a process in which electronic system 100B enters a suspend or sleep mode, software 104B may pass a device identifier of electronic system 100B to NIC 114B before software 104B is suspended. Firmware 410B of NIC 114B stores the received device identifier of electronic system 100B on RAM 412B of NIC 114B. NIC 114B may then be able to access the device identifier of electronic system 100B from RAM 412B without waking up other components of electronic system 100B, e.g., the processor 110 shown in FIG. 1.

As shown in FIG. 4, NIC 114A, as directed by firmware 410A, transmits discovery frame 320. In some embodiments, the broadcasting of discovery frame 320 is initiated by software 104A, e.g., by Application A 160A. As shown in FIG. 3A, discovery frame 320 passes through networking device 220 to electronic system 100B. At electronic system 100B, discovery frame 320 is received at NIC 114B and processed by firmware 410B. Firmware 410B of NIC 114B directly responds to discovery frame 320 without involvement of software 104B. For example, if electronic system 100B is in a suspend mode, firmware 410B causes NIC 114B to transmit response frame 330B without waking electronic system 100B, e.g., without waking or involving software 104B, including operating system 180B and Application A 160B.

Discovery frame 320 may include details indicating to at least a subset of devices on local network 210 (e.g., to electronic system 100B) that it is a discovery frame. For example, firmware 410 of electronic systems 100 may be programmed to associate a particular EtherType and/or payload value with a discovery frame.

FIG. 5 illustrates one example of a discovery frame 500, which may be discovery frame 320. As shown in FIG. 5, discovery frame 500 contains a destination MAC address indicating a broadcast frame, a source MAC address of electronic system 100A, a reserved EtherType (in this example, 0x8200), and a payload value recognized by electronic system 100B (in this example, FFFFFFDEADBEEF).

The illustrated EtherType and payload value are merely examples, and firmware 410 may be programmed to recognize a different EtherType and/or payload value as a discovery frame. The EtherType may be a reserved EtherType, e.g., a hexadecimal number that is not used by an existing standard. The payload value may include any pattern that is stored in firmware 410; DEADBEEF is just one example of a magic number that may be used. The payload value may be any other pattern, e.g., ABABABAB, DEADCODE, 1234ABCD, or any other set value.

In some embodiments, the payload value is not fixed, but instead changes according to some programmed pattern. For example, firmware 410A and 410B may combine (e.g., using a hash function) a first, fixed value (e.g., a first hexadecimal number) with a second, varying value (e.g., a second hexadecimal number) to calculate the payload value. The varying value may be based on a network state, current time, or other variable known to firmware 410A and 410B.

Response frame 330B may include a destination MAC address matching the source MAC address of discovery frame 320, a source MAC address of electronic system 100B, the same EtherType of discovery frame 320, and a payload that includes a device identifier of electronic system 100B, which was stored on NIC 114B, as described above. FIG. 5 further illustrates one example of a response frame 510 containing this information. In the example response frame 510, the payload is a TLV (type, length, value) element, where the type field indicates a type of device identifier, the length field indicates the length of the device identifier, and the value field provides the device identifier.

While FIG. 4 illustrates a single electronic system 100B responding to discovery frame 320, other electronic systems 100 (e.g., electronic systems 100C) may receive and respond to discovery frame 320 in a similar manner. In addition, while electronic system 100A transmits discovery frame 320 and electronic systems 100B and 100C respond to discovery frame 320, in other embodiments or at different times, a different electronic system 100 (e.g., electronic system 100B) may transmit a discovery frame, and electronic system 100A may respond to the discovery frame in a similar manner to electronic system 100B.

The discovery sequence illustrated in FIGS. 3 and 4 may occur at regular intervals. For example, electronic system 100A may transmit a discovery frame 320 hourly, daily, weekly, etc., and provide updates to server 240 at this cadence or a different (e.g., less frequent) cadence. In some embodiments, software 104A may determine, based on received response frames, whether any new (e.g., previously undiscovered) electronic systems 100 are on the local network 210, and transmit an update to server 240 with information (e.g., device identifier) of the undiscovered electronic system(s) 100.

Exemplary Methods for First Exemplary Device Discovery Sequence

Figure 6:
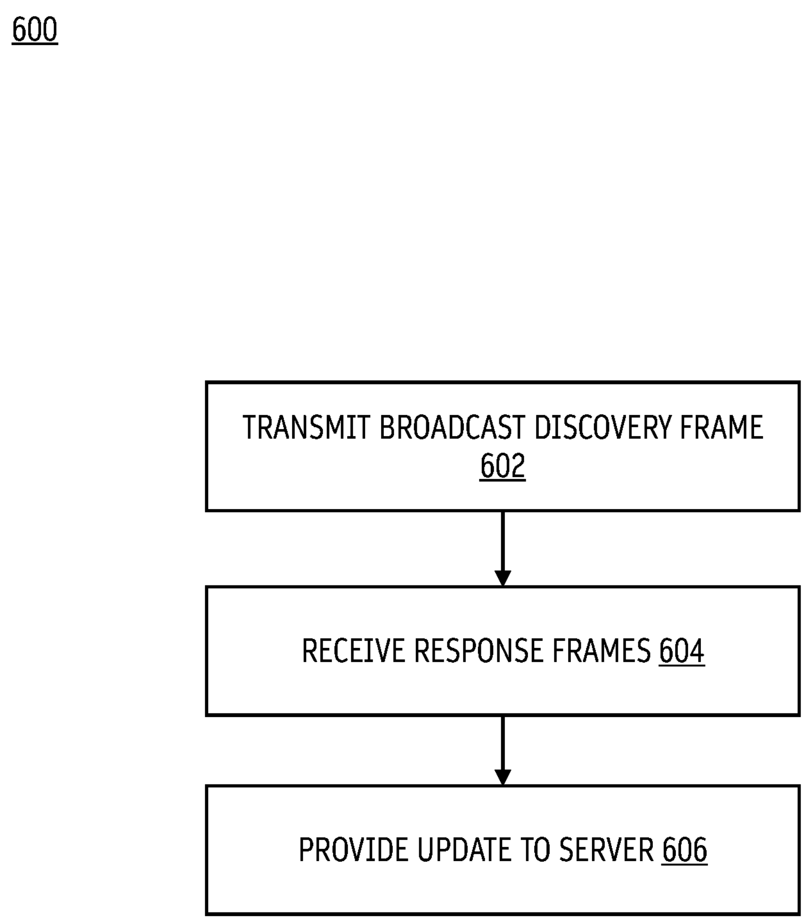
FIG. 6 depicts a flow diagram illustrating exemplary operations for discovering other devices on a local network, according to some embodiments of the disclosure.

FIG. 6 depicts a flow diagram illustrating exemplary operations for discovering other devices on a local network, according to some embodiments of the disclosure. The operations may be performed by components in electronic system 100A as illustrated in FIGS. 3 and 4.

In 602, an electronic system (e.g., firmware 410A of electronic system 100A) broadcasts a discovery frame. The discovery frame (e.g., discovery frame 320) is a broadcast frame that may be broadcast to devices within a local network (e.g., local network 210).

In 604, the electronic system receives one or more response frames from one or more other electronic systems on the local network, e.g., as shown in FIG. 3B and discussed above. The electronic system may open a raw socket on PROT=0x8200 to receive the response frames. A response frame may include a source MAC address of the electronic system sending the response frame. A response frame may include a device identifier of the electronic system sending the response frame. The device identifier and/or source MAC address may be known to a server, e.g., server 240 that communicates with or manages electronic systems 100.

In 606, the electronic system provides an update to a server (e.g., server 240). For example, electronic system 100A transmits an update to server 240 describing other electronic systems (e.g., electronic systems 100B and 100C) on the local network (e.g., local network 210). Server 240 may use information in the update (e.g., device identifiers supplied by electronic system 100A) to determine a group of electronic systems 100 on local network 210, e.g., a group of electronic systems 100 within a household.

Figure 7:
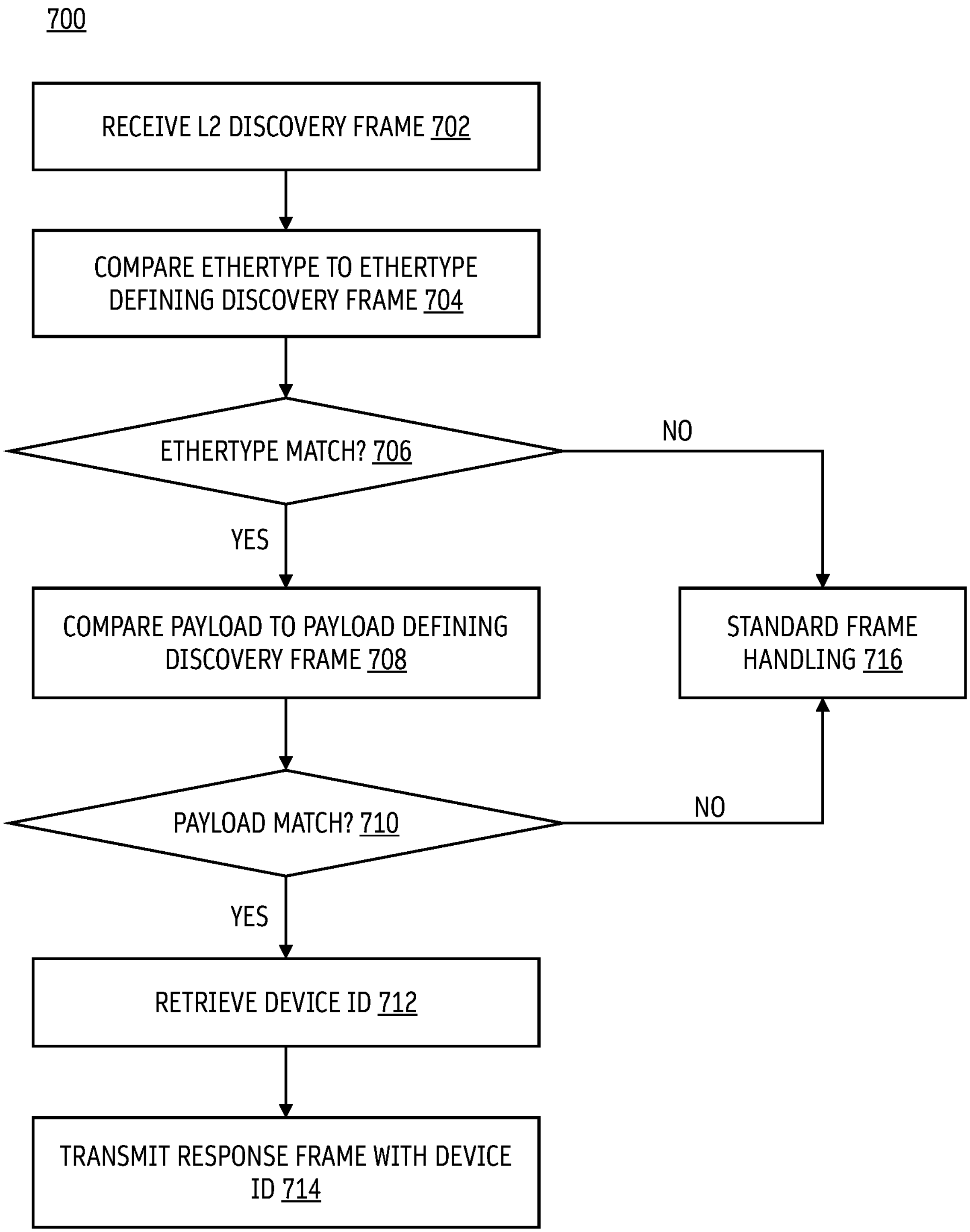
FIG. 7 depicts a flow diagram illustrating exemplary operations for responding to a discovery request, according to some embodiments of the disclosure.

FIG. 7 depicts a flow diagram illustrating exemplary operations for responding to a discovery request, according to some embodiments of the disclosure.

In 702, a NIC (e.g., NIC 114B of electronic system 100B) receives an L2 discovery frame, e.g., discovery frame 320.

In 704, the NIC, which is controlled by firmware (e.g., firmware 410B), compares the EtherType of the discovery frame to an EtherType that defines a discovery frame, e.g., an EtherType stored on a memory (RAM or ROM) of the NIC.

In 706, the NIC determines whether the EtherType of the received discovery frame matches the stored EtherType defining a discovery frame.

If YES is determined in 706, in 708, the NIC, which is controlled by firmware (e.g., firmware 410B), compares a payload of the discovery frame to a payload value that defines a discovery frame, e.g., a payload value stored on a memory (RAM or ROM) of the NIC.

In 710, the NIC determines whether the payload of the received discovery frame matches the stored payload defining a discovery frame.

If YES is determined in 710, the NIC retrieves a device identifier (device ID) of the electronic system including the NIC in 712. For example, the NIC (e.g., a processing component executing firmware 410B) retrieves a device ID stored on RAM 412B.

In 714, the NIC transmits a response frame that includes the retrieved device ID to the electronic system from which the discovery frame was received.

If NO is determined in 706 or 710, NIC may proceed to a standard frame handling procedure in 716. For example, NIC may determine whether to ignore a received frame, or, if electronic system 100B is asleep, to wake software 104B on electronic system 100B, based on the contents of the received frame.

Second Exemplary Device Discovery Sequence

In the example of FIGS. 3-7, NIC 114B responded to discovery frame 320 without waking up other components of electronic system 100B. In that example, NIC 114B stored the device ID of electronic system 100B in RAM 412B. In some cases, a NIC may not store a device ID (e.g., due to limited space in RAM) and instead, NIC provides a wake signal to a processor (e.g., processor 110) in response to receiving a discovery frame. This wake signal may be referred to as a discovery wake signal. The discovery wake signal may be different and distinguishable from a standard wake signal for waking electronic system 100.

Figure 8A:
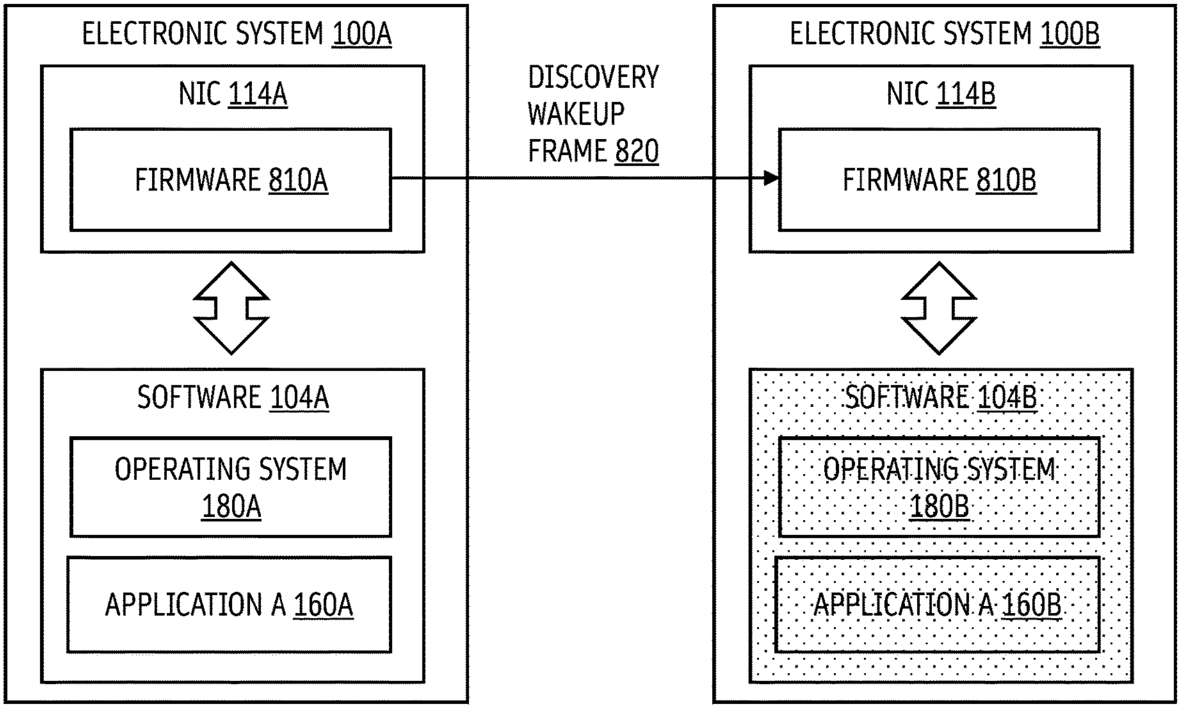
FIGS. 8A and 8B illustrate a pair of electronic systems performing a second discovery sequence, according to some embodiments of the disclosure.
Figure 8B:
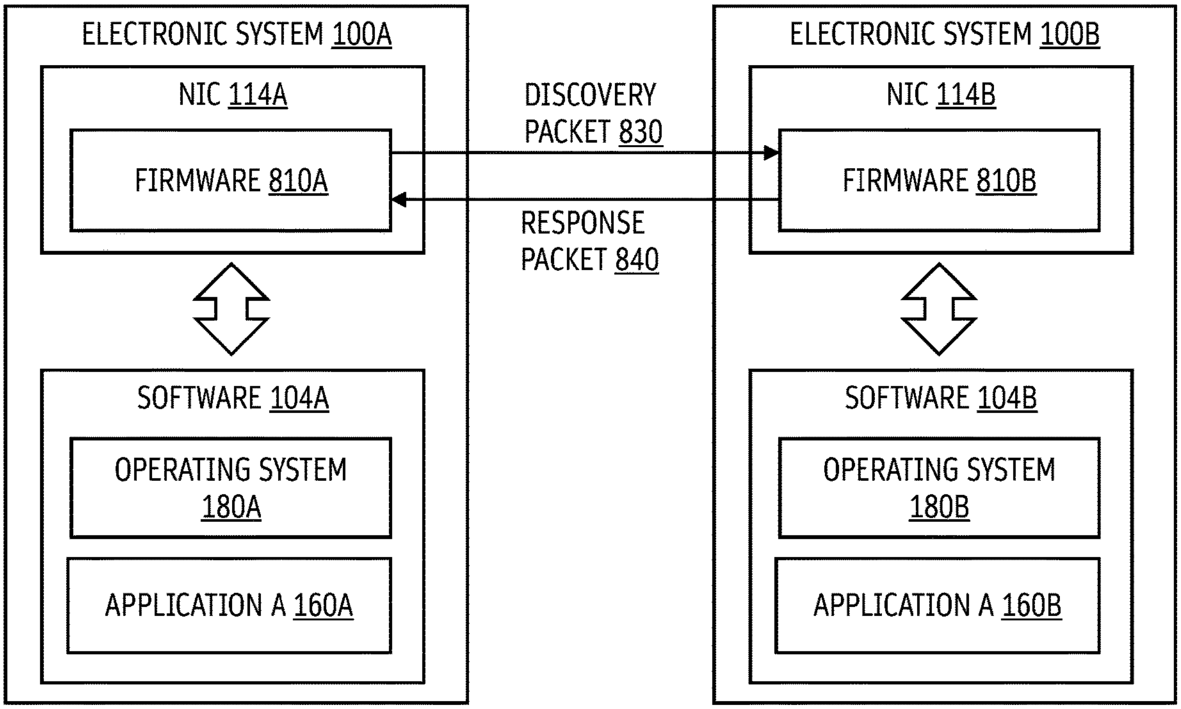

FIGS. 8A and 8B illustrate a pair of electronic systems performing a second exemplary discovery sequence. FIGS. 8A and 8B illustrate example components of electronic system 100A and electronic system 100B, shown in FIG. 1. Each electronic system 100A and 100B includes a NIC (here, NIC 114A and 114B, respectively), which are examples of NIC 114 of FIG. 1. NICs 114A and 114B (referred to jointly as NICs 114 or individually as NIC 114) include, respectively, firmware 810A and 810B (referred to jointly as firmware 810 or individually as firmware 810). Firmware 810 is computer software that provides low-level control of device-specific hardware of NIC 114. For example, firmware 810 may act as the operating system of NIC 114.

Firmware 810 may be stored on non-volatile memory (e.g., read-only memory (ROM) or flash memory) of NIC 114. Each of the electronic systems 100A and 100B further includes software 104A or 104B, which includes operating system 180A or 180B and Application A 160A or 160B. In FIG. 8A, software 104B, including operating system 180B and Application A 160B, is asleep or suspended, as indicated by the shading over software 104B and its components.

Electronic systems 100A and 100B may be coupled together on a local network, e.g., local network 210 shown in FIG. 2. For example, the networking device 220 may pass discovery wakeup frame 820, discovery packet 830, and response packet 840 between electronic systems 100A and 100B. Furthermore, discovery wakeup frame 820 and discovery packet 830 may be a broadcast frame and packet, respectively, so that discovery wakeup frame 820 and discovery packet 830 are transmitted by networking device 220 to multiple electronic systems (e.g., electronic systems 100B and 100C) on the local network 210.

Turning first to FIG. 8A, electronic system 100A transmits discovery wakeup frame 820 to electronic system 100B. Discovery wakeup frame 820, which is transmitted by NIC 114A, is a communication at the data link layer of the OSI model. Like discovery frame 320, discovery wakeup frame 820 is a broadcast frame, e.g., with a destination MAC address FF:FF:FF:FF:FF:FF, and a source MAC address indicating the MAC address of electronic system 100A. In some embodiments, the broadcasting of discovery wakeup frame 820 may be initiated by software 104A, e.g., by Application A 160A.

Discovery wakeup frame 820 may include details indicating to at least a subset of devices on local network 210

(e.g., to electronic system 100B) that it is a discovery wakeup frame, and firmware 810 of electronic systems 100 may be programmed to associate a particular EtherType and/or payload value with a discovery wakeup frame. Discovery wakeup frame 820 may be similar to discovery frames 320 and 500 described above, and include similar information (e.g., EtherType and payload value) to discovery frame 320 and/or discovery frame 500.

At electronic system 100B, discovery wakeup frame 820 is received at firmware 810B of NIC 114B. Firmware 810B of NIC 114B processes discovery wakeup frame 820 and determines whether to wake up suspended software 104B. For example, if electronic system 100B is in a suspend state, and firmware 810B determines that a received frame is a discovery wakeup frame, NIC 114B transmits a discovery wake signal to processor 110, which causes software 104B to enter a discovery wake state. If electronic system 100B is not in a suspend state, NIC 114B may not transmit the discovery wake signal, as software 104B is already awake.

The discovery wake signal may be different from a standard wake signal. For example, the discovery wake signal may be a pulse transmitted from NIC 114B to a general purpose input/output (GPIO) pin of processor 110. The pulse may have a different pulse width from a standard wakeup signal sent to the GPIO pin to wake up software 104B executing on processor 110. For example, the discovery wake signal may have a pulse width of 30 milliseconds. In other examples, the discovery wake signal includes a set of pulses following a predetermined pattern. The processor 110 is programmed to respond to the discovery wake signal by entering a discovery wake state, which may be another low-power state in which software 104B can respond to a discovery packet, but does not perform certain other operations (e.g., turning on peripheral devices, such as a display) associated with resuming operations from a suspend state, as described above.

In response to the discovery wake signal, software 104B (e.g., operating system 180B) may open a socket to receive a discovery packet. For example, if discovery packets are Simple Service Discovery Protocol (SSDP) packets, operating system 180B may open a socket for SSDP packets.

Turning to FIG. 8B, after discovery wakeup frame 820 was received at electronic system 100B, software 104B is in discovery wake state and has at least partially resumed operation, as indicated by the lack of shading of software 104B. In some cases, one or more components (e.g., Application A 160B) may still be suspended in the discovery wake state.

After transmitting discovery wakeup frame 820, electronic system 100A transmits discovery packet 830. As noted above, discovery packet 830 may be a broadcast packet that is transmitted after discovery wakeup frame 820. In some embodiments, electronic system 100A may broadcast discovery packet 830 a set number of times (e.g., 5 times or 10 times), to ensure that discovery packet 830 is received at the other electronic systems 100 on local network 210. Discovery packet 830 may be an SSDP packet. Discovery packet 830 may be at a higher layer of the OSI model, e.g., at the application layer or layer 7. In other embodiments, a different communication protocol may be used for discovery packet 830.

In response to discovery packet 830, software 104B generates response packet 840, which is transmitted from NIC 114B to electronic system 100A. Response packet 840 may include a device identifier of electronic system 100B.

While FIG. 8 illustrates a single electronic system 100B responding to discovery wakeup frame 820 and discovery packet 830, other electronic systems 100 (e.g., electronic systems 100C) may receive and respond to discovery wakeup frame 820 and discovery packet 830 in a similar manner. In addition, while electronic system 100A transmits discovery wakeup frame 820 and discovery packet 830 and electronic systems 100B and 100C respond to discovery frame 320, in other embodiments or at different times, a different electronic system 100 (e.g., electronic system 100B) may transmit a discovery wakeup frame and discovery packet, and electronic system 100A may respond to the discovery wakeup frame and discovery packet in a similar manner to electronic system 100B.

The discovery sequence illustrated in FIGS. 8A and 8B may occur at regular intervals. For example, electronic system 100A may transmit a discovery wakeup frame 820 and discovery packet 830 hourly, daily, weekly, etc., and provide updates to server 240 at this cadence or a different (e.g., less frequent) cadence. In some embodiments, software 104A may determine, based on received response frames, whether any new (e.g., previously undiscovered) electronic systems 100 are on the local network 210, and transmit an update to server 240 with information (e.g., device identifier) of the undiscovered electronic system(s) 100.

Exemplary Methods for Second Exemplary Device Discovery Sequence

Figure 9:
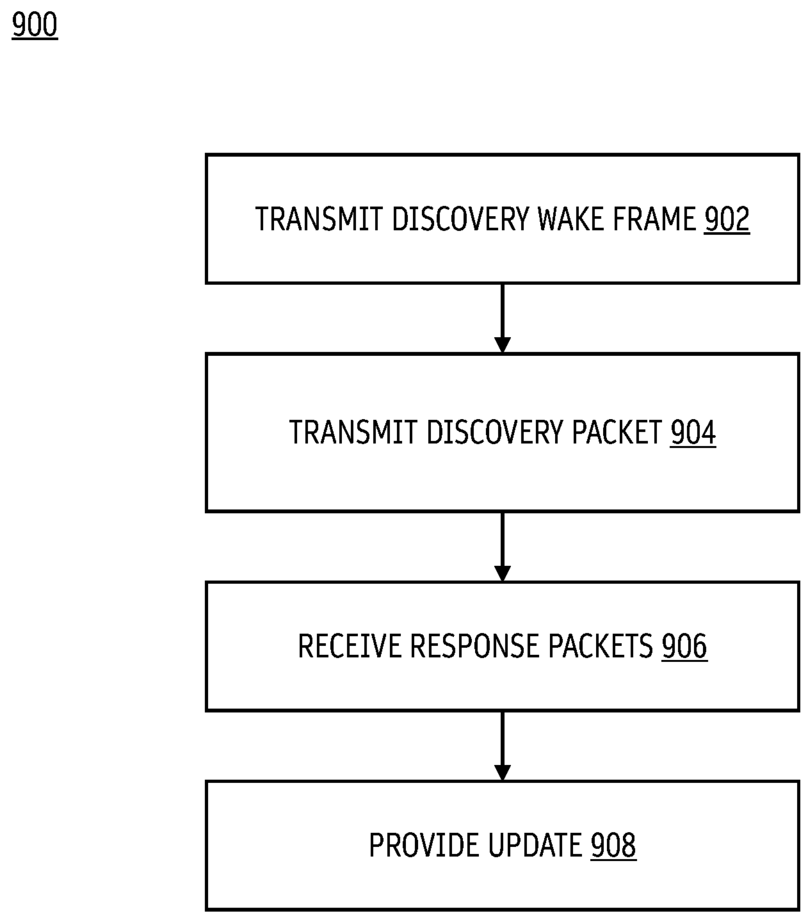
FIG. 9 depicts a flow diagram illustrating exemplary operations for discovering other devices on a local network according to the second discovery sequence, according to some embodiments of the disclosure.

FIG. 9 depicts a flow diagram illustrating exemplary operations for discovering other devices on a local network according to the second discovery sequence, according to some embodiments of the disclosure. The operations may be performed by components in electronic system 100A as illustrated in FIG. 8.

In 902, an electronic system (e.g., firmware 810A of electronic system 100A) broadcasts a discovery wake frame. The discovery wake frame (e.g., discovery wakeup frame 820) is a broadcast frame that may be broadcast to devices within a local network (e.g., local network 210).

In 904, the electronic system broadcasts a discovery packet. The discovery packet may use a different networking protocol than the discovery wake frame. For example, the discovery wake frame may be a level 2 frame, while the discovery packet is at a higher level of the OSI model. The electronic system may transmit the discovery packet N times, where N>1.

In 906, the electronic system receives one or more response packets from one or more other electronic systems on the local network, e.g., as shown in FIG. 8B and discussed above. A response packet may include a device identifier of the electronic system sending the response packet. The device identifier may be known to a server, e.g., server 240 that communicates with or manages electronic systems 100.

In 908, the electronic system provides an update to a server (e.g., server 240). For example, electronic system 100A transmits an update to server 240 describing other electronic systems (e.g., electronic systems 100B and 100C) on the local network (e.g., local network 210). Server 240 may use information in the update (e.g., device identifiers supplied by electronic system 100A) to determine a group of electronic systems 100 on local network 210, e.g., a group of electronic system 100 within a household.

Figure 10:
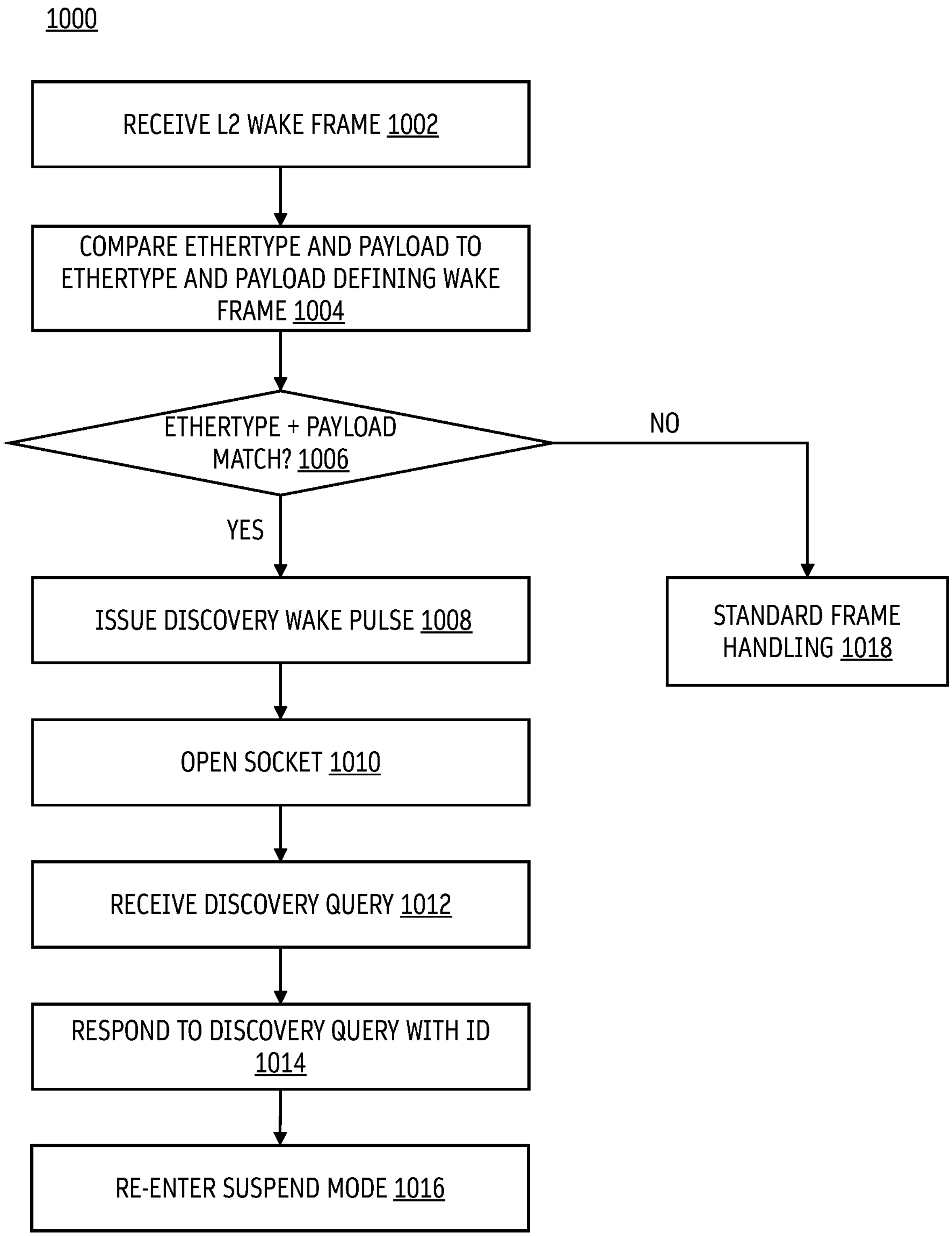
FIG. 10 depicts a flow diagram illustrating exemplary operations for responding to a discovery request according to the second discovery sequence, according to some embodiments of the disclosure.

FIG. 10 depicts a flow diagram illustrating exemplary operations for responding to a discovery request, according to some embodiments of the disclosure.

In 1002, a NIC (e.g., NIC 114B of electronic system 100B) receives an L2 wake frame, e.g., discovery wakeup frame 820.

In 1004, the NIC, which is controlled by firmware (e.g., firmware 810B), compares the EtherType and payload of the received frame to an EtherType that defines a wake frame (e.g., a discovery wakeup frame), e.g., an EtherType and payload value stored on a memory (RAM or ROM) of the NIC.

In 1006, the NIC determines whether the EtherType and payload of the received frame matches the stored EtherType and payload defining a discovery wake frame. In some embodiments, 1004 and 1006 may be separated into separate steps for comparing the EtherTypes and determining a match, and compared the payloads and determining a match, as shown in FIG. 6.

If YES is determined in 1006, in 1008, the NIC, which is controlled by firmware (e.g., firmware 810B), issues a discovery wake pulse to the electronic system, e.g., to a GPIO pin of processor 110 of electronic system 100B. The NIC may issue the discovery wake pulse if the electronic system is in a suspend state; if the electronic system is already in a wake state, the NIC may not issue the discovery wake pulse.

In 1010, the electronic system opens a socket (e.g., an SSDP socket) for receiving further discovery-related communications from the electronic system that transmitted the L2 wake frame.

In 1012, the electronic system receives a discovery query, e.g., discovery packet 830, at the socket opened in 1010.

In 1014, the electronic system responds to the discovery query with the device ID of the electronic system. For example, the electronic system transmits a response packet that includes the device ID to the electronic system from which the discovery query was received.

In 1016, the electronic system re-enters a suspend mode.

If NO is determined in 1006, NIC may proceed to a standard frame handling procedure in 1018. For example, NIC may determine whether to ignore a received frame, or, if electronic system 100B is asleep, to wake software 104B on electronic system 100B, based on the contents of the received frame.

Example Computing Device

Figure 11:
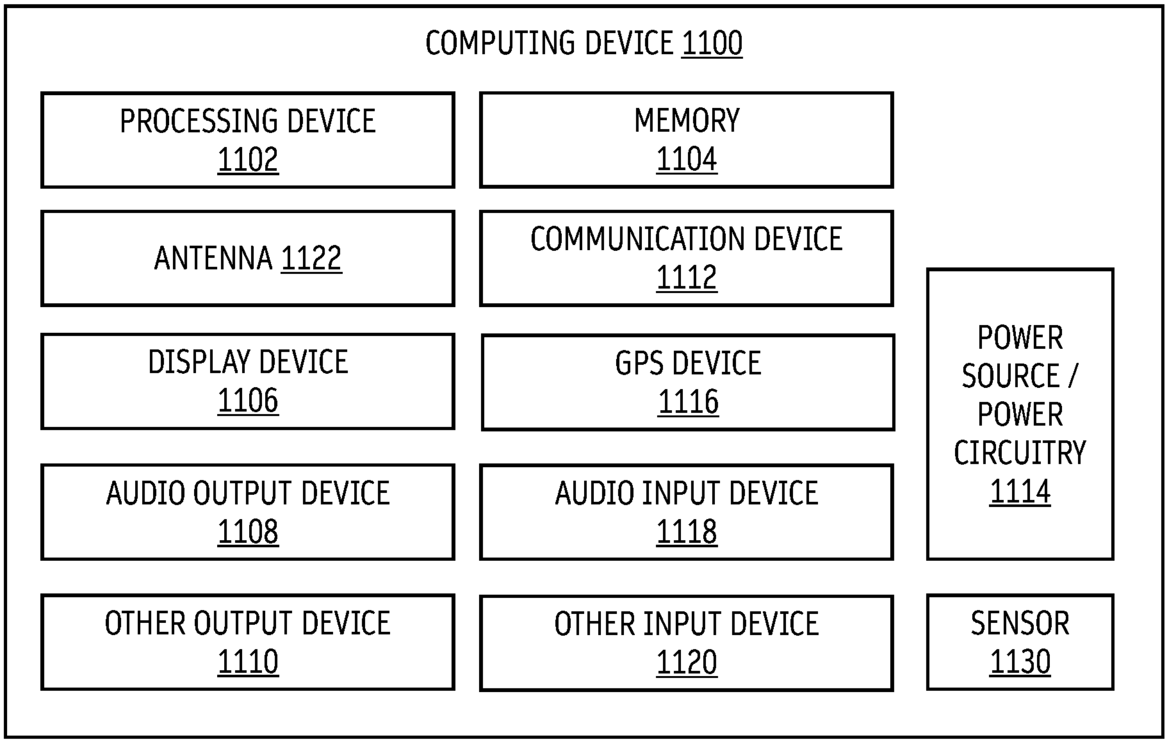
FIG. 11 depicts a block diagram of an exemplary computing device, according to some embodiments of the disclosure.

FIG. 11 depicts a block diagram of an exemplary computing device 1100, according to some embodiments of the disclosure. One or more computing devices, such as computing device 1100, may be used to implement the functionalities described with reference to the FIGS. and herein. A number of components are illustrated in the FIGS. as included in computing device 1100, but any one or more of these components may be omitted or duplicated, as suitable for the application. In some embodiments, some or all of the components included in the computing device 1100 may be attached to one or more motherboards. In some embodiments, some or all of these components are fabricated onto a single system on a chip (SoC) die. Additionally, in various embodiments, the computing device 1100 may not include one or more of the components illustrated in FIG. 11, and the computing device 1100 may include interface circuitry for coupling to the one or more components. For example, the computing device 1100 may not include a display device 1106, and may include display device interface circuitry (e.g., a connector and driver circuitry) to which a display device 1106 may be coupled. In another set of examples, the computing device 1100 may not include an audio input device 1118 or an audio output device 1108 and may include audio input or output device interface circuitry (e.g., connectors and supporting circuitry) to which an audio input device 1118 or audio output device 1108 may be coupled.

The computing device 1100 may include a processing device 1102 (e.g., one or more processing devices, one or more of the same type of processing device, one or more of different types of processing device). The processing device 1102 may include electronic circuitry that process electronic data from data storage elements (e.g., registers, memory, resistors, capacitors, quantum bit cells) to transform that electronic data into other electronic data that may be stored in registers and/or memory. Examples of processing device 1102 may include a central processing unit (CPU), a graphical processing unit (GPU), a quantum processor, a machine learning processor, an artificial intelligence processor, a neural network processor, an artificial intelligence accelerator, an application specific integrated circuit (ASIC), an analog signal processor, an analog computer, a microprocessor, a digital signal processor, a field programmable gate array (FPGA), a tensor processing unit (TPU), a data processing unit (DPU), etc.

The computing device 1100 may include a memory 1104, which may itself include one or more memory devices such as volatile memory (e.g., DRAM), nonvolatile memory (e.g., read-only memory (ROM)), high bandwidth memory (HBM), flash memory, solid state memory, and/or a hard drive. Memory 1104 includes one or more non-transitory computer-readable storage media. In some embodiments, memory 1104 may include memory that shares a die with the processing device 1102. In some embodiments, memory 1104 includes one or more non-transitory computer-readable media storing instructions executable to perform operations described with the FIGS., such as operations described with software 104 (e.g., including one or more of: operating system 180, Application A 160, and Application B 162). The instructions stored in the one or more non-transitory computer-readable media may be executed by processing device 1102. In some embodiments, memory 1104 may store data, e.g., data structures, binary data, bits, metadata, files, blobs, etc., as described with the FIGS. and herein.

In some embodiments, the computing device 1100 may include a communication device 1112 (e.g., one or more communication devices). For example, communication device 1112 may be configured for managing wired and/or wireless communications for the transfer of data to and from the computing device 1100. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. The communication device 1112 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultramobile broadband (UMB) project (also referred to as "3GPP2"), etc.). IEEE 802.16 compatible Broadband Wireless Access (BWA) networks are generally referred to as WiMAX networks, an acronym that stands for worldwide interoperability for microwave access, which is a certification mark for products that pass conformity and interoperability tests for the IEEE 802.16 standards. The communication device 1112 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication device 1112 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication device 1112 may operate in accordance with Code-division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication device 1112 may operate in accordance with other wireless protocols in other embodiments. The computing device 1100 may include an antenna 1122 to facilitate wireless communications and/or to receive other wireless communications (such as radio frequency transmissions). The computing device 1100 may include receiver circuits and/or transmitter circuits. In some embodiments, the communication device 1112 may manage wired communications, such as electrical, optical, or any other suitable communication protocols (e.g., the Ethernet). As noted above, communication device 1112 may include multiple communication chips. For instance, a first communication device 1112 may be dedicated to shorter-range wireless communications such as Wi-Fi or Bluetooth, and a second communication device 1112 may be dedicated to longer-range wireless communications such as global positioning system (GPS), EDGE, GPRS, CDMA, WiMAX, LTE, EV-DO, or others. In some embodiments, a first communication device 1112 may be dedicated to wireless communications, and a second communication device 1112 may be dedicated to wired communications.

The computing device 1100 may include power source/power circuitry 1114. The power source/power circuitry 1114 may include one or more energy storage devices (e.g., batteries or capacitors) and/or circuitry for coupling components of the computing device 1100 to an energy source separate from the computing device 1100 (e.g., DC power, AC power, etc.).

The computing device 1100 may include a display device 1106 (or corresponding interface circuitry, as discussed above). Display device 1106 may include any visual indicators, such as a heads-up display, a computer monitor, a projector, a touchscreen display, a liquid crystal display (LCD), a light-emitting diode display, or a flat panel display, for example.

The computing device 1100 may include an audio output device 1108 (or corresponding interface circuitry, as discussed above). The audio output device 1108 may include any device that generates an audible indicator, such as speakers, headsets, or earbuds, for example.

The computing device 1100 may include an audio input device 1118 (or corresponding interface circuitry, as discussed above). The audio input device 1118 may include any device that generates a signal representative of a sound, such as microphones, microphone arrays, or digital instruments (e.g., instruments having a musical instrument digital interface (MIDI) output).

The computing device 1100 may include a GPS device 1116 (or corresponding interface circuitry, as discussed above). The GPS device 1116 may be in communication with a satellite-based system and may receive a location of the computing device 1100, as known in the art.

The computing device 1100 may include a sensor 1130 (or one or more sensors). The computing device 1100 may include corresponding interface circuitry, as discussed above). Sensor 1130 may sense physical phenomenon and translate the physical phenomenon into electrical signals that can be processed by, e.g., processing device 1102. Examples of sensor 1130 may include: capacitive sensor, inductive sensor, resistive sensor, electromagnetic field sensor, light sensor, camera, imager, microphone, pressure sensor, temperature sensor, vibrational sensor, accelerometer, gyroscope, strain sensor, moisture sensor, humidity sensor, distance sensor, range sensor, time-of-flight sensor, pH sensor, particle sensor, air quality sensor, chemical sensor, gas sensor, biosensor, ultrasound sensor, a scanner, etc.

The computing device 1100 may include another output device 1110 (or corresponding interface circuitry, as discussed above). Examples of the other output device 1110 may include an audio codec, a video codec, a printer, a wired or wireless transmitter for providing information to other devices, haptic output device, gas output device, vibrational output device, lighting output device, home automation controller, or an additional storage device.

The computing device 1100 may include another input device 1120 (or corresponding interface circuitry, as discussed above). Examples of the other input device 1120 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The computing device 1100 may have any desired form factor, such as a handheld or mobile computer system (e.g., a cell phone, a smart phone, a mobile internet device, a music player, a tablet computer, a laptop computer, a netbook computer, a personal digital assistant (PDA), an ultramobile personal computer, a remote control, wearable device, headgear, eyewear, footwear, electronic clothing, etc.), a desktop computer system, a server or other networked computing component, a printer, a scanner, a monitor, a set-top box, an entertainment control unit, a vehicle control unit, a digital camera, a digital video recorder, an Internet-of-Things device (e.g., light bulb, cable, power plug, power source, lighting system, audio assistant, audio speaker, smart home device, smart thermostat, camera monitor device, sensor device, smart home doorbell, motion sensor device), a virtual reality system, an augmented reality system, a mixed reality system, or a wearable computer system. In some embodiments, the computing device 1100 may be any other electronic device that processes data.

Select Examples

Example 1 provides a method including receiving a broadcast discovery frame at a network interface controller of a device in a suspend state, the network interface controller operating at a data link layer; determining that an EtherType of the broadcast discovery frame matches a particular EtherType, the particular EtherType stored on the network interface controller; determining that a payload of the broadcast discovery frame matches a particular payload value, the particular payload value stored on the network interface controller; in response to determining that the EtherType and the payload of the broadcast discovery frame match the particular EtherType and the particular payload value: retrieving a device identifier of the device, the device identifier stored by the network interface controller; and transmitting, from the network interface controller, a response frame, where a payload of the response frame includes the retrieved device identifier.

Example 2 provides the method of example 1, where the network interface controller does not wake another component of the device in response to determining that the EtherType and the payload of the broadcast discovery frame match the particular EtherType and the particular payload value.

Example 3 provides the method of example 1 or 2, where the broadcast discovery frame is a Wi-Fi frame.

Example 4 provides the method of any preceding example, where the particular EtherType is a reserved EtherType.

Example 5 provides the method of any preceding example, where the particular EtherType is 0x8200.

Example 6 provides the method of any preceding example, further including providing the device identifier of the device to the network interface controller; and entering the suspend state.

Example 7 provides the method of any preceding example, where the device identifier is stored on a memory of the network interface controller.

Example 8 provides a device including a network interface controller including firmware and a memory, the firmware configured to: receive a broadcast discovery frame; determine that an EtherType of the broadcast discovery frame matches a particular EtherType, the particular EtherType stored on the network interface controller; determine that a payload of the broadcast discovery frame matches a particular payload value, the particular payload value stored on the network interface controller; in response to determining that the EtherType and the payload of the broadcast discovery frame match the particular EtherType and the particular payload value: retrieve a device identifier of the device, the device identifier stored on the memory of the network interface controller; and transmit, from the network interface controller, a response frame, where a payload of the response frame includes the retrieved device identifier; and a processing component to store the device identifier of the device on the memory of the network interface controller.

Example 9 provides the device of example 8, where the network interface controller does not wake the processing component in response to determining that the EtherType and the payload of the broadcast discovery frame match the particular EtherType and the particular payload value.

Example 10 provides the device of example 8 or 9, where the broadcast discovery frame is a Wi-Fi frame.

Example 11 provides the device of one of examples 8-10, where the particular EtherType is a reserved EtherType.

Example 12 provides the device of one of examples 8-11, where the particular EtherType is 0x8200.

Example 13 provides the device of one of examples 8-12, where the processing component is to provide the device identifier of the device to the network interface controller prior to entering a suspend state.

Example 14 provides the device of one of examples 8-13, where the device identifier is stored on a memory of the network interface controller.

Example 15 provides one or more non-transitory computer-readable media storing instructions that, when executed by one or more processors, cause the one or more processors to: receive a broadcast discovery frame at a network interface controller of a device, the network interface controller operating at a data link layer; determine that an EtherType of the broadcast discovery frame matches a particular EtherType, the particular EtherType stored on the network interface controller; determine that a payload of the broadcast discovery frame matches a particular payload value, the particular payload value stored on the network interface controller; in response to determining that the EtherType and the payload of the broadcast discovery frame match the particular EtherType and the particular payload value: retrieve a device identifier of the device, the device identifier stored by the network interface controller; and transmit, from the network interface controller, a response frame, where a payload of the response frame includes the retrieved device identifier.

Example 16 provides the one or more non-transitory computer-readable media of example 15, where the network interface controller does not wake another component of the device in response to determining that the EtherType and the payload of the broadcast discovery frame match the particular EtherType and the particular payload value.

Example 17 provides the one or more non-transitory computer-readable media of example 15 or 16, where the broadcast discovery frame is a Wi-Fi frame.

Example 18 provides the one or more non-transitory computer-readable media of one of examples 15-17, where the particular EtherType is a reserved EtherType.

Example 19 provides the one or more non-transitory computer-readable media of one of examples 15-18, where the particular EtherType is 0x8200.

Example 20 provides the one or more non-transitory computer-readable media of any of examples 15-19, where the instructions further cause the one or more processors to: provide the device identifier of the device to the network interface controller; and entering the suspend state.

Example 21 provides a method including receiving a discovery wakeup frame at a network interface controller of a device, the network interface controller operating at a data link layer; determining that an EtherType of the discovery wakeup frame matches a particular EtherType and that a payload of the discovery wakeup frame matches a particular payload value, the particular EtherType and the particular payload value stored on the network interface controller; in response to determining that the EtherType and the payload of the discovery wakeup frame match the particular EtherType and the particular payload value, issuing a discovery wake signal to a processing component of the device; receiving a discovery packet at the network interface controller following the discovery wakeup frame; transmitting at least a portion of the discovery packet to the processing component; receiving a device identifier from the processing component; and transmitting, from the network interface controller, a response packet that includes the device identifier.

Example 22 provides the method of example 21, where discovery wakeup frame is a Wi-Fi frame.

Example 23 provides the method of example 21 or 22, where the particular EtherType is a reserved EtherType.

Example 24 provides the method of one of examples 21-23, where issuing the discovery wake signal includes transmitting a pulse to a general purpose input/output (GPIO) pin of the processing component.

Example 25 provides the method of example 24, where the pulse has a pulse length associated with a discovery wakeup response, where the discovery wakeup response does not include at least one function of a non-discovery wakeup response.

Example 26 provides the method of example 25, where the discovery wakeup response does not turn on a display associated with the device.

Example 27 provides the method of one of examples 21-26, where the discovery packet is a Simple Service Discovery Protocol (SSDP) packet.

Example 28 provides a method including broadcasting a discovery wakeup frame to a local network, the discovery wakeup frame including an EtherType and a payload associated with a discovery wakeup request; broadcasting a discovery packet to the local network; receiving a response to the discovery packet from a device on the local network, the response including a device identifier; and transmitting the device identifier to a server.

Example 29 provides the method of example 29, further including broadcasting the discovery packet a set number of additional times.

Example 30 provides the method of example 28 or 29, where the device from which the response is received is associated with the server.

Example 31 provides the method of one of examples 28-30, where the discovery packet is a Simple Service Discovery Protocol (SSDP) packet, and the response is a SSDP response.

Example 32 provides the method of one of examples 28-31, where the particular EtherType is a reserved EtherType.

Example 33 provides the method of one of examples 28-32, where, in response to receiving the discovery wakeup frame, the device on the local network does not perform a full wakeup.

Example A provides one or more non-transitory computer-readable media storing instructions that, when executed by one or more processors, cause the one or more processors to perform any one of the methods described herein.

Example B provides an apparatus comprising means to carry out or means for carrying out any one of the methods provided in examples 1-33, and/or any one of the methods described herein.

Example C provides a computer-implemented system, comprising one or more processors, and one or more non-transitory computer-readable media storing instructions that, when executed by the one or more processors, cause the one or more processors to perform any one of the methods provided in examples 1-33 and/or any one of the methods described herein.

Example D provides a computer-implemented system comprising one or more components illustrated in FIG. 1 to perform operations described herein.

Example E provides a computing device comprising one or more components illustrated in FIG. 11 to perform operations described herein.

VARIATIONS AND OTHER NOTES

The description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

For purposes of explanation, specific numbers, materials and configurations are set forth in order to provide a thorough understanding of the illustrative implementations. However, it will be apparent to one skilled in the art that the present disclosure may be practiced without the specific details and/or that the present disclosure may be practiced with only some of the described aspects. In other instances, well known features are omitted or simplified in order not to obscure the illustrative implementations.

Further, references are made to the accompanying drawings that form a part hereof, and in which are shown, by way of illustration, embodiments that may be practiced. It is to be understood that other embodiments may be utilized, and structural or logical changes may be made without departing from the scope of the present disclosure. Therefore, the above detailed description is not to be taken in a limiting sense.

Various operations may be described as multiple discrete actions or operations in turn, in a manner that is most helpful in understanding the disclosed subject matter. However, the order of description should not be construed as to imply that these operations are necessarily order dependent. In particular, these operations may not be performed in the order of presentation. Operations described may be performed in a different order from the described embodiment. Various additional operations may be performed or described operations may be omitted in additional embodiments.

For the purposes of the present disclosure, the phrase "A or B" or the phrase "A and/or B" means (A), (B), or (A and B). For the purposes of the present disclosure, the phrase "A, B, or C" or the phrase "A, B, and/or C" means (A), (B), (C), (A and B), (A and C), (B and C), or (A, B, and C). The term "between," when used with reference to measurement ranges, is inclusive of the ends of the measurement ranges.

The description uses the phrases "in an embodiment" or "in embodiments," which may each refer to one or more of the same or different embodiments. The terms "comprising," "including," "having," and the like, as used with respect to embodiments of the present disclosure, are synonymous. The disclosure may use perspective-based descriptions such as "above," "below," "top," "bottom," and "side" to explain various features of the drawings, but these terms are simply for ease of discussion, and do not imply a desired or required orientation. The accompanying drawings are not necessarily drawn to scale. Unless otherwise specified, the use of the ordinal adjectives "first," "second," and "third," etc., to describe a common object, merely indicates that different instances of like objects are being referred to and are not intended to imply that the objects so described must be in a given sequence, either temporally, spatially, in ranking or in any other manner.

In the detailed description, various aspects of the illustrative implementations will be described using terms commonly employed by those skilled in the art to convey the substance of their work to others skilled in the art.

The terms "substantially," "close," "approximately," "near," and "about," generally refer to being within +/−20% of a target value as described herein or as known in the art. Similarly, terms indicating orientation of various elements, e.g., "coplanar," "perpendicular," "orthogonal," "parallel," or any other angle between the elements, generally refer to being within +/−5-20% of a target value as described herein or as known in the art.

In addition, the terms "comprise," "comprising," "include," "including," "have," "having" or any other variation thereof, are intended to cover a non-exclusive inclusion. For example, a method, process, or device, that comprises a list of elements is not necessarily limited to only those elements but may include other elements not expressly listed or inherent to such method, process, or device. Also, the term "or" refers to an inclusive "or" and not to an exclusive "or."

The systems, methods and devices of this disclosure each have several innovative aspects, no single one of which is solely responsible for all desirable attributes disclosed herein. Details of one or more implementations of the subject matter described in this specification are set forth in the description and the accompanying drawings.

The invention claimed is:

1. A method comprising:

receiving a broadcast discovery frame at a network interface controller of a device in a suspend state, the network interface controller operating at a data link layer;

determining that an EtherType of the broadcast discovery frame matches a particular EtherType, the particular EtherType stored on the network interface controller;

determining that a payload of the broadcast discovery frame matches a particular payload value, the particular payload value stored on the network interface controller;

in response to determining that the EtherType and the payload of the broadcast discovery frame match the particular EtherType and the particular payload value:

retrieving a device identifier of the device, the device identifier stored by the network interface controller; and while the device is in the suspend state, transmitting, from the network interface controller, a response frame, wherein a payload of the response frame comprises the retrieved device identifier.

2. The method of claim 1, wherein the network interface controller does not wake another component of the device in response to determining that the EtherType and the payload of the broadcast discovery frame match the particular EtherType and the particular payload value.

3. The method of claim 1, wherein the broadcast discovery frame is a Wi-Fi frame.

4. The method of claim 1, wherein the particular EtherType is a reserved EtherType.

5. The method of claim 1, wherein the particular EtherType is 0x8200.

6. The method of claim 1, further comprising:

providing the device identifier of the device to the network interface controller; and entering the suspend state.

7. The method of claim 1, wherein the device identifier is stored on a memory of the network interface controller.

8. A device comprising:

a network interface controller comprising firmware and a memory, the firmware configured to:

receive a broadcast discovery frame while the device is in a suspend state;

determine that an EtherType of the broadcast discovery frame matches a particular EtherType, the particular EtherType stored on the network interface controller;

determine that a payload of the broadcast discovery frame matches a particular payload value, the particular payload value stored on the network interface controller;

in response to determining that the EtherType and the payload of the broadcast discovery frame match the particular EtherType and the particular payload value:

retrieve a device identifier of the device, the device identifier stored on the memory of the network interface controller; and while the device is in the suspend state, transmit, from the network interface controller, a response frame, wherein a payload of the response frame comprises the retrieved device identifier; and a processing component to store the device identifier of the device on the memory of the network interface controller.

9. The device of claim 8, wherein the network interface controller does not wake the processing component in response to determining that the EtherType and the payload of the broadcast discovery frame match the particular EtherType and the particular payload value.

10. The device of claim 8, wherein the broadcast discovery frame is a Wi-Fi frame.

11. The device of claim 8, wherein the particular EtherType is a reserved EtherType.

12. The device of claim 8, wherein the particular EtherType is 0x8200.

13. The device of claim 8, wherein the processing component is to provide the device identifier of the device to the network interface controller prior to entering the suspend state.

14. The device of claim 8, wherein the device identifier is stored on a memory of the network interface controller.

15. One or more non-transitory computer-readable media storing instructions that, when executed by one or more processors, cause the one or more processors to:

receive a broadcast discovery frame at a network interface controller of a device in a suspend state, the network interface controller operating at a data link layer;

determine that an EtherType of the broadcast discovery frame matches a particular EtherType, the particular EtherType stored on the network interface controller;

determine that a payload of the broadcast discovery frame matches a particular payload value, the particular payload value stored on the network interface controller;

in response to determining that the EtherType and the payload of the broadcast discovery frame match the particular EtherType and the particular payload value:

retrieve a device identifier of the device, the device identifier stored by the network interface controller; and while the device is in the suspend state, transmit, from the network interface controller, a response frame, wherein a payload of the response frame comprises the retrieved device identifier.

16. The one or more non-transitory computer-readable media of claim 15, wherein the network interface controller does not wake another component of the device in response to determining that the EtherType and the payload of the broadcast discovery frame match the particular EtherType and the particular payload value.

17. The one or more non-transitory computer-readable media of claim 15, wherein the broadcast discovery frame is a Wi-Fi frame.

18. The one or more non-transitory computer-readable media of claim 15, wherein the particular EtherType is a reserved EtherType.

19. The one or more non-transitory computer-readable media of claim 15, wherein the particular EtherType is 0x8200.

20. The one or more non-transitory computer-readable media of claim 15, wherein the instructions further cause the one or more processors to:

provide the device identifier of the device to the network interface controller; and entering the suspend state.

* * * * *